United States Patent
Uchida et al.

(10) Patent No.: US 11,586,909 B2
(45) Date of Patent: Feb. 21, 2023

(54) INFORMATION PROCESSING METHOD, INFORMATION PROCESSING APPARATUS, AND COMPUTER READABLE STORAGE MEDIUM

(71) Applicant: KDDI CORPORATION, Tokyo (JP)

(72) Inventors: Yusuke Uchida, Fujimino (JP);
Shigeyuki Sakazawa, Fujimino (JP);
Yuki Nagai, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 939 days.

(21) Appl. No.: 16/424,108

(22) Filed: May 28, 2019

(65) Prior Publication Data
US 2019/0279087 A1    Sep. 12, 2019

Related U.S. Application Data

(63) Continuation of application No. PCT/JP2017/045684, filed on Dec. 20, 2017.

(30) Foreign Application Priority Data

Jan. 13, 2017    (JP) .............................. JP2017-003849

(51) Int. Cl.
*G06N 3/08*    (2006.01)
*G06N 20/20*    (2019.01)
(Continued)

(52) U.S. Cl.
CPC .............. *G06N 3/08* (2013.01); *G06F 21/10* (2013.01); *G06K 9/6215* (2013.01); *G06N 3/02* (2013.01);
(Continued)

(58) Field of Classification Search
CPC .......... G06N 20/20; G06N 20/10; G06N 3/02; G06N 3/0454; G06F 21/10; G06K 9/6215
(Continued)

(56) References Cited

U.S. PATENT DOCUMENTS 5,166,539 A * 11/1992 Uchimura .............. G06N 3/063
706/26
5,240,009 A *  8/1993 Williams ............... A61N 1/365
600/515
(Continued)

FOREIGN PATENT DOCUMENTS

EP    0120975 A1    10/1984
JP    S5966703 A     4/1984
(Continued)

OTHER PUBLICATIONS

Ashmore, Dec. 2015, "Evaluating the Intrinsic Similarity between Neural Networks" (Year: 2015).*
Ashmore, 2015, "A Method for Finding Similarity between Multi-Layer Perceptrons by Forward Bipartite Alignment" (Year: 2015).*
Extended European Search Report for European Patent Application No. 17891539.3 dated Jan. 2, 2020.
(Continued)

*Primary Examiner* — Abdullah Al Kawsar
*Assistant Examiner* — Jun Kwon
(74) *Attorney, Agent, or Firm* — Thomas Horstemeyer, LLP

(57) ABSTRACT

An information processing method includes: reading a layer structure and parameters of layers from each of models of two neural networks; and determining a degree of matching between the models of the two neural networks, by comparing layers, of the respective models of the two neural networks, that are configured as a graph-like form in respective hidden layers, in order from an input layer using breadth first search or depth first search, based on similarities between respective layers.

11 Claims, 9 Drawing Sheets

(51) Int. Cl.
*G06N 20/10* (2019.01)
*G06K 9/62* (2022.01)
*G06N 3/04* (2006.01)
*G06N 3/02* (2006.01)
*G06F 21/10* (2013.01)

(52) U.S. Cl.
CPC .......... *G06N 3/0454* (2013.01); *G06N 20/10* (2019.01); *G06N 20/20* (2019.01)

(58) Field of Classification Search
USPC ........................................................ 706/25
See application file for complete search history.

(56) References Cited

U.S. PATENT DOCUMENTS

| | | | | |
|---|---|---|---|---|
| 8,977,578 | B1* | 3/2015 | Cruz-Albrecht | G06N 3/04 706/12 |
| 9,418,458 | B2 | 8/2016 | Chertok et al. | |
| 2006/0072679 | A1* | 4/2006 | Chen | H04L 27/0012 375/261 |
| 2015/0006444 | A1 | 1/2015 | Tamatsu et al. | |
| 2016/0041982 | A1* | 2/2016 | He | G06F 16/24578 707/728 |
| 2016/0196672 | A1 | 7/2016 | Chertok et al. | |
| 2017/0004399 | A1* | 1/2017 | Kasahara | G06N 3/0454 |
| 2017/0337472 | A1* | 11/2017 | Durdanovic | G06N 3/082 |
| 2018/0018590 | A1* | 1/2018 | Szeto | G06N 20/10 |

FOREIGN PATENT DOCUMENTS

| | | | |
|---|---|---|---|
| JP | 2013025356 | A | 2/2013 |
| JP | 2014026389 | A | 2/2014 |
| JP | 2015011510 | A | 1/2015 |
| JP | 2015052832 | A | 3/2015 |
| JP | 2015057630 | A | 3/2015 |
| WO | 2018131409 | A1 | 7/2018 |

OTHER PUBLICATIONS

Zager et al, Graph similarity scoring and matching, Applied Mathematics Letters, Nov. 21, 2007, pp. 86-94, vol. 21, No. 1, Elsevier Ltd., Amsterdam, NL.

International Search Report for PCT/JP2017/045684 dated Mar. 13, 2018 (partially translated).

Rizhevsky et al., ImageNet Classification with Deep Convolutional Neural Networks, NIPS'12, pp. 1-9.

Simonyan et al., Very Deep Convolutional Networks for Large-Scale Image Recognition, ICLR'15, Apr. 10, 2015, pp. 1-14.

Ma et al., End-to-end Sequence Labeling via Bi-directional LSTM-CNNs-CRF, Proceedings of the 54th Annual Meeting of the Association for Computational Linguistics, ACL'16, Aug. 7-12, 2016, pp. 1064-1074, Berlin, Germany.

Ren et al., Faster R-CNN: Towards Real-Time Object Detection with Region Proposal Networks, Microsoft Research, NIPS'15, 1-9.

Liu et al., SSD: Single Shot MultiBox Detector, ECCV'16, Dec. 29, 2016, pp. 1-17.

Yu et al., Digital Watermarking based on Neural Networks for Color Images, Signal Processing vol. 81, No. 3, 2001, pp. 663-671.

El'Arbi et al., Video Watermarking Based on Neural Networks, IEEE, 2006, pp. 1577-1580.

Li et al., Lecture 7: Convolutional Neural Networks, Stanford University, Jan. 27, 2016, URL:http://cs231n.stanford.edu/slides/winter1516_lecture7.pdf, retrieved Jan. 4, 2017, pp. 1-89.

Regularization, Wikipedia Japan, Internet URL:https://ja.wikipedia.org/wiki/%E6%AD%A3%E5%89%87%E5%8C%96, retrieved Jan. 4, 2017.

Krogh et al., A Simple Weight Decay Can Improve Generalization, Proc. of NIPS, 1992, pp. 950-957.

Jia et al., Caffe: Deep Learning Framework, BAIR, Internet URL:http://caffe.berkeleyvision.org/, retrieved Jan. 5, 2017.

Why TensorFlow, TensorFlow, Internet URL:https://wvww.tensorflow.org/, retrieved Jan. 5, 2017.

Chainer: A Flexible Framework for Neural Networks, Internet URL:http://chainer.org/, retrieved Jan. 5, 2017.

\* cited by examiner

INFORMATION PROCESSING METHOD, INFORMATION PROCESSING APPARATUS, AND COMPUTER READABLE STORAGE MEDIUM

CROSS-REFERENCE TO RELATED APPLICATIONS

This application is a continuation of International Patent Application No. PCT/JP2017/045684 filed on Dec. 20, 2017, which claims priority to and the benefit of Japanese Patent Application No. 2017-003849 filed on Jan. 13, 2017, the entire disclosures of which are incorporated herein by reference.

TECHNICAL FIELD

The present invention relates to a technique for determining a modification of a model parameter in a neural network.

BACKGROUND ART

Neural networks have recently been garnering attention in fields of image recognition, speech recognition, and natural language processing. The neural network refers to a mathematical model for expressing characteristics of the brain of a living body by computer simulation. It refers to overall models in which artificial neurons (units) that form a network through connection of synapses evolves to have a problem-solving ability by changing bond strengths of synapses by training.

Patent Literatures (PTLs) 1 to 3 and Non-Patent Literatures (NPTLs) 1 to 3 disclose techniques for optimizing the structure of a neural network. Also, PTL 2 discloses a technique for efficiently setting weights in a large scale convolutional neural network. Also, PTL 3 discloses a technique for detecting an audio event using a neural network. Moreover, NPTLs 1 and 2 disclose a convolutional neural network appropriate for image recognition. Also, NPTL 3 discloses a technology for estimating the class of a word using a neural network.

Model parameters of a large scale neural network requires training for a long period of time. For example, NPTL 2 discloses that a training for two to three weeks is required using four GPUs (Graphics Processing Units). Therefore, NPTLs 4 and 5 disclose techniques for setting model parameters by using a portion of model parameters that have been trained in advance, or by performing re-training using trained model parameters as initial values.

CITATION LIST

Patent Literature

PTL 1: Japanese Patent Laid-Open No. 2015-11510
PTL 2: Japanese Patent Laid-Open No. 2015-52832
PTL 3: Japanese Patent Laid-Open No. 2015-57630

Non-Patent Literature

NPTL 1: A. Krizhevsky, I. Sutskever and G. E. Hinton, "ImageNet Classification with Deep Convolutional Neural Networks," NIPS'12.
NPTL 2: K. Simonyan and A. Zisserman, "Very Deep Convolutional Networks for Large-Scale Image Recognition," ICLR'15.
NPTL 3: X. Ma and E. Hovy, "End-to-end Sequence Labeling via Bi-directional LSTM-CNNs-CRF," ACL'16.
NPTL 4: S. Ren, K. He, R. Girshick, and J. Sun, "Faster R-CNN: Towards Real-Time Object Detection with Region Proposal Networks," NIPS'15.
NPTL 5: W. Liu, et al., "SSD: Single Shot MultiBox Detector," ECCV'16.
NPTL 6: P.-T. Yu, H.-H. Tsai, and J.-S. Lin, "Digital watermarking based on neural networks for color images," in Signal Processing, vol. 81, no. 3,2001.
NPTL 7: M. Elarbi, C. B. Amar, and H. Nicolas, "Video Watermarking Based on Neural Networks," in Proc. of ICME, 2006.
NPTL 8: Fei-Fei Li & Andrej Karpathy & Justin Johnson, Lecture 7, Convolutional Neural Networks, 27 Jan. 2016, [online] Internet, URL:http://cs231n.stanford.edu/slides/winter1516_lecture7.pdf, retrieved in Jan. 4, 2017.
NPTL 9: Regularization, [online], Internet, URL:https://ja.wikipedia.org/wiki/%E6%AD%A3%E5%89%87%E5%8C%96, retrieved in Jan. 5, 2017.
NPTL 10: A. Krogh and J. A. Hertz, "A Simple Weight Decay Can Improve Generalization," in Proc. of NIPS, 1992.
NPTL 11: Caffe, [online] Internet, URL:http://caffe.berkeleyvision.org/, retrieved in Jan. 5, 2017.
NPTL 12: TensorFlow, [online] Internet, URL:https://www.tensorflow.org/, retrieved in Jan. 5, 2017.
NPTL 13: Chainer, [online] Internet, URL:http://chainer.org/, retrieved in Jan. 5, 2017.

SUMMARY OF INVENTION

Technical Problem

As described above, if all model parameters are trained from scratch using a large scale neural network, a large amount of calculation cost and efforts are required. Therefore, there are cases where a research institute distributes trained model parameters in a license form for allowing re-use thereof.

However, in a commercial service, the trained model parameters themselves are a core technology in the service, and in general, the re-use thereof is prohibited.

For example, an unauthorized use of an image or the like can be easily visually found out. However, it is not easy to visually find out an unauthorized use of model parameters.

Solution to Problem

The present invention is to provide a technique for detecting a modification even if a portion of a neural network model is modified or re-trained.

According to one aspect of the present invention, an information processing method includes: reading a layer structure and parameters of layers from each of models of two neural networks; and determining a degree of matching between the models of the two neural networks, by comparing layers, of the respective models of the two neural networks, that are configured as a graph-like form in respective hidden layers, in order from an input layer using breadth first search or depth first search, based on similarities between respective layers.

Other features and advantages of the present invention will be apparent from the following description taken in conjunction with the accompanying drawings. Note that the

DESCRIPTION OF EMBODIMENTS

Hereinafter, embodiments of the present invention will be described in detail using the drawings.

Figure 1:
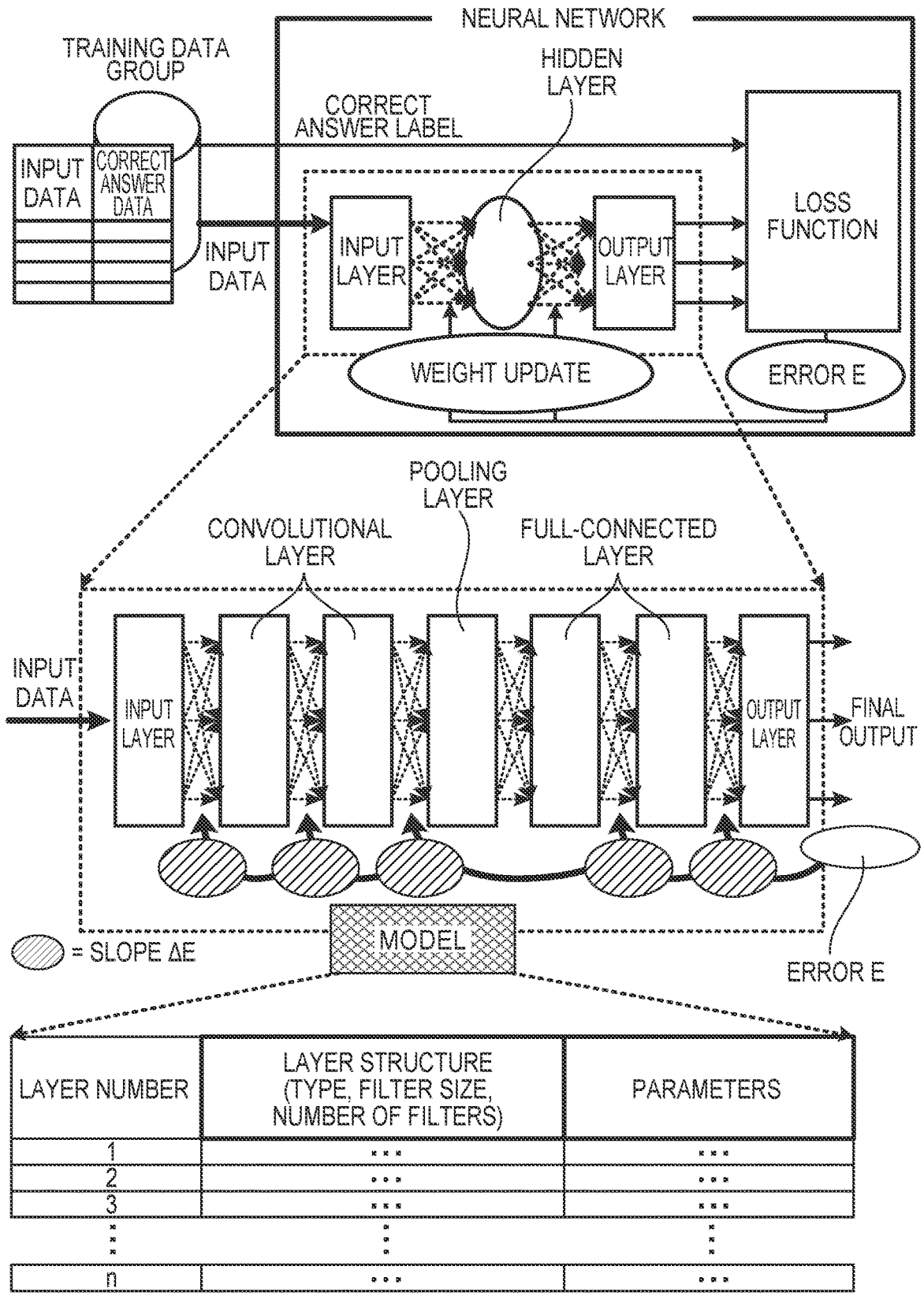
FIG. 1 is a general functional configuration diagram of a neural network.

FIG. 1 is a general functional configuration diagram of a neural network.

Various configurations are adopted as the neural network, but basically, the neural network is expressed as overlaying (or a graph structure) of a plurality of types of layers. Training data in which input data is associated with a correct answer label is input to the neural network. Also, in the neural network, model parameters are trained such that an ultimate output result corresponding to the input data matches the correct answer label (output corresponding to the input is approximated according to a task).

According to FIG. 1, a feedforward neural network includes three layers, namely an input layer, a hidden layer, and an output layer, and input data propagates, in one direction, from the input layer toward the output layer. The hidden layer may be constituted by a plurality of layers. Each layer includes a plurality of units (neurons), and a parameter with respect to an input from a unit in a forward layer to a unit in a backward layer is referred to as a "weight". Training means to calculate an appropriate "weight" as the parameter with respect to this input. A convolutional neural network (CNN) is also shown in FIG. 1 as the feedforward neural network.

The training refers to an operation to appropriately update weights in the respective layers using an error between the output data from the output layer corresponding to input data and the correct answer label associated with the input data. A "loss function" is defined in order to calculate the error. The error sequentially propagates from the output layer side toward the input layer through "backpropagation", and the weights in the respective layers are updated little by little. Finally, a convergent calculation is executed in which weights in the respective layers are adjusted to appropriate values such that the error is reduced.

Also, in FIG. 1, a model that has been trained in the neural network is shown. The "model" stores, for each layer included in the hidden layer, a "layer structure" and "parameters" in association with the layer structure. The layer structure is indicated by a layer type, a filter size, the number of filters, and the like. The parameter is an element of a trained weight (weight filter).

Figure 2:
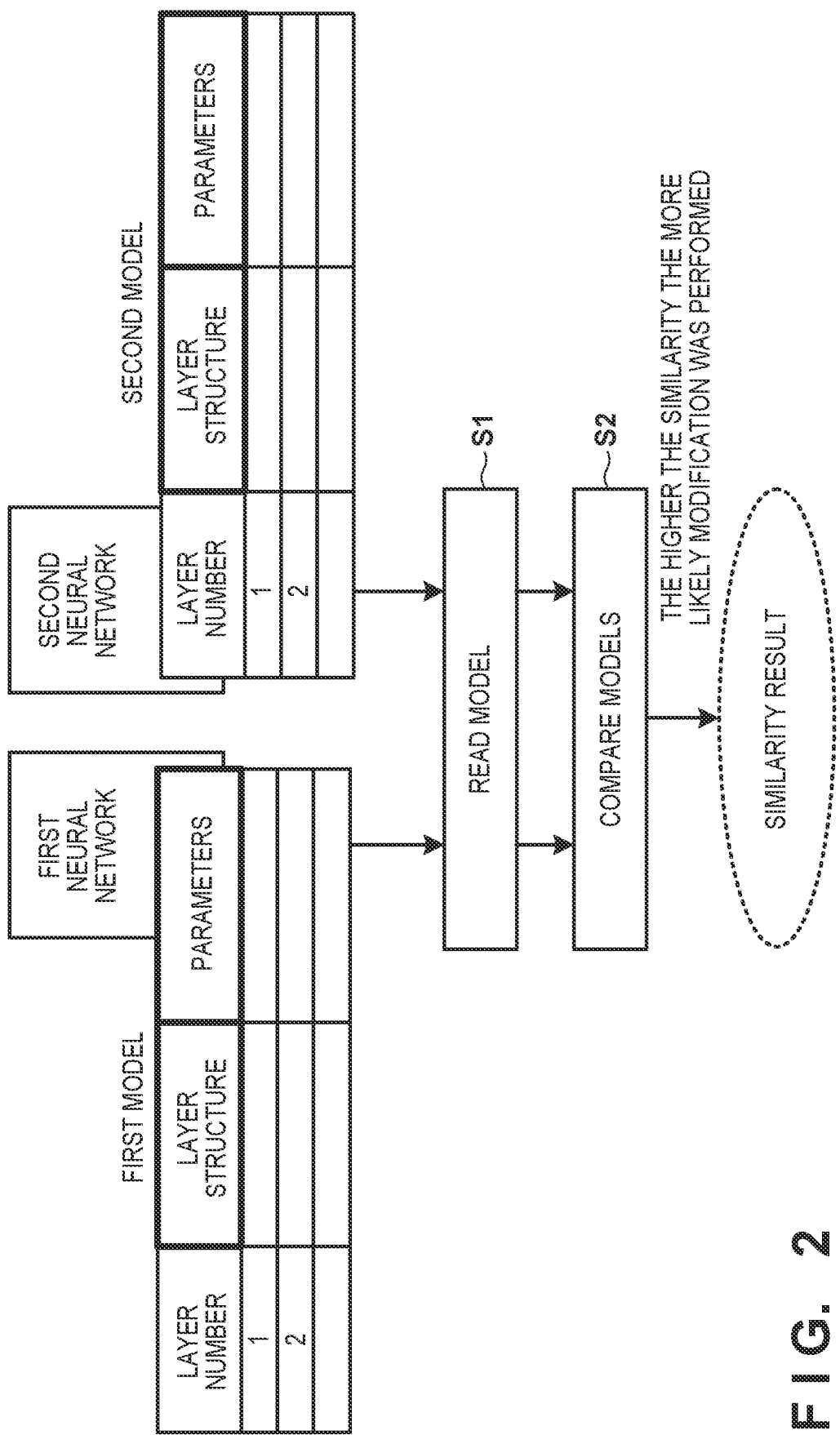
FIG. 2 is a diagram illustrating an information processing method according to one embodiment.

FIG. 2 is a diagram illustrating an information processing method to be executed by an information processing apparatus in the present embodiment.

The information processing apparatus of the present embodiment performs comparison between two neural network models. The information processing apparatus executes the following two steps.

S1: The layer structure and parameters for each layer are read from the respective neural network models. There are various types of forms with respect to the model according to the deep learning framework. For example, in the case of Caffe, the network configuration is described by a prototxt file, and the trained parameters are saved in a caffemodel file (refer to NPTL 11). Also, in the case of TensorFlow, the trained model is saved in a ckpt file (refer to NPTL 12). Moreover, in the case of Chainer, the trained model is saved in an HDF5 format (refer to NPTL 13). These models of the neural network are essentially, even in a different form, expressed by a "layer structure" and "parameters". In S1, these models in different forms are read, and are internally stored in a common format. In S1, these models in various forms are read in a form in which these models can be compared.

S2: It is determined whether or not two neural networks are the same by comparing the layer structure and parameters of the models thereof. If it is determined that the two models are the same, it is possible that one model has been generated by modifying or re-training the other model.

Figure 3:
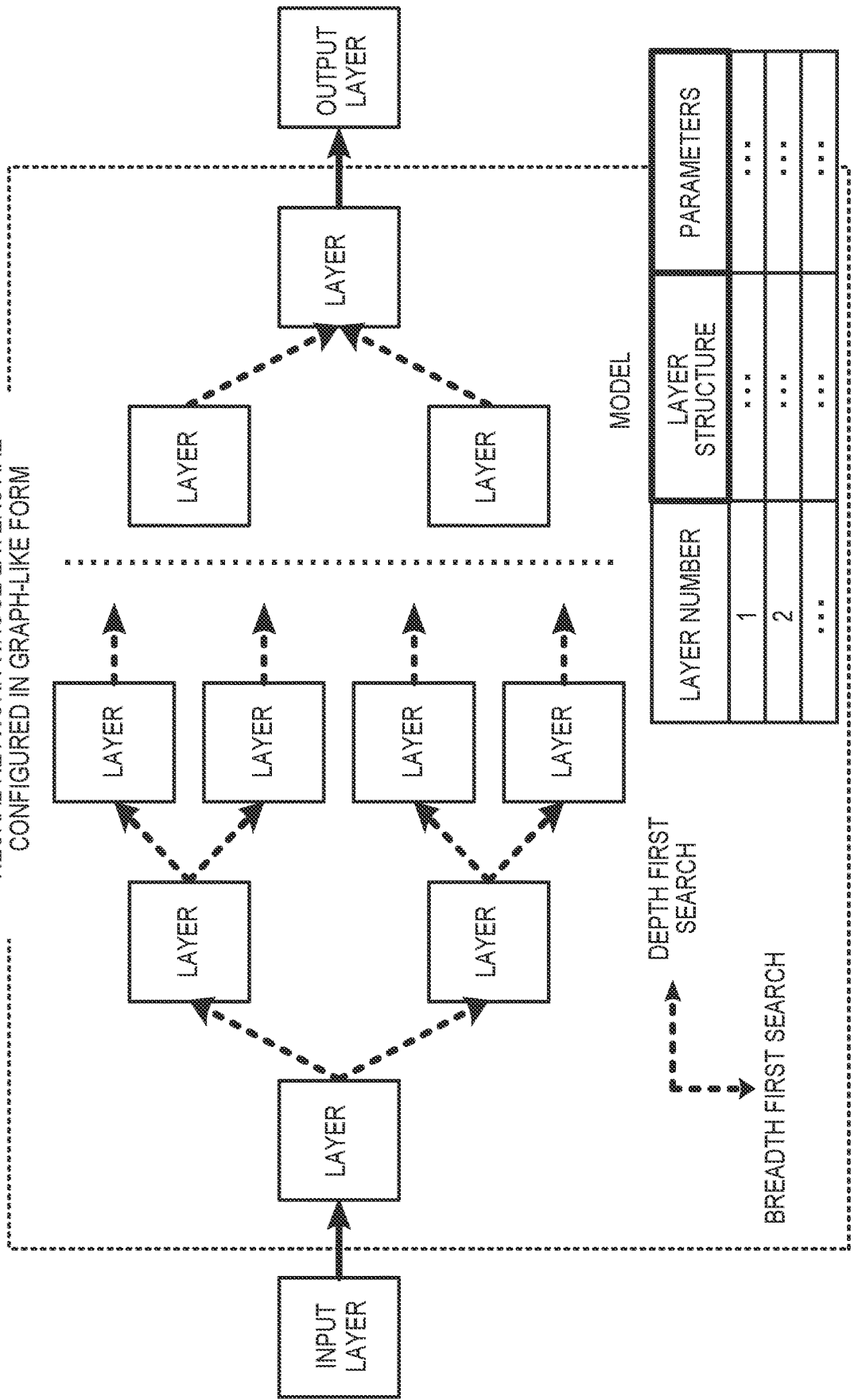
FIG. 3 is a diagram illustrating a neural network in which a plurality of layers are configured in a graph-like form.

FIG. 3 is a diagram illustrating a neural network in which a plurality of layers are configured in a graph-like form.

According to FIG. 3, a feedforward neural network is shown in which a plurality of layers are configured in a graph-like form. Types of the hidden layers includes, for example;
a convolutional layer,
an activation layer,
a pooling layer, and
a full-connected layer.

According to S2, the layers, in the hidden layers in the respective neural networks, that are configured in a graph-like form are compared in order from the input layer side (lowest layer) using "breadth first search" or "depth first search". The breadth first search is to perform searching in order from a layer closer to the input layer. The depth first search is to perform searching to a layer closer to the output layer as long as the layers are connected from the input layer.

Determination of Types of Layers to be Compared

According to one embodiment, if the "types" of layers to be compared are different, the similarity is set to 0, and comparison with respect to layers in a later stage than the layers subjected to comparison is not performed. That is, if the types of layers are different, it can be determined that it is not possible that one model is generated by modifying the other model (models are determined to be not the same) with respect to the relationship between the models. Specifically, with respect to two models, it is determined whether or not the models are the same by comparing the types of layers in order from the respective input layers (lowest layers). With respect to the two models, layers in the next level are selected using breadth first search or depth first search and compared.

Also, even if the "types" of layers are different, if the input and the output are the same with respect to the two layers, the two layers may be determined as the same and the comparison therebetween may be skipped. For example, with respect to a layer that outputs inputs while merely changing the sequence of the inputs is determined to be a layer with respect to which the input and the output are the same. For example, a full-connected layer that merely changes the sequence of inputs or 1×1 pooling layer comes under this category.

For example, if the "types" of two layers to be compared are different (convolutional layer and activation layer, for example), it is determined that the two layers does not match. Note that, because the convolutional layer is considered to be one type of the full-connected layer, it can be determined that a full-connected layer that outputs the same output as a convolutional layer is the same as the convolutional layer.

As described above, in a simplest model, only the "types" of two layers are determined. However, there may also be a case where the layer structure and parameters of a model are modified even if layers are of the same type. Therefore, if the types of layers to be compared are the same, it is determined whether or not the layers are the same by further comparing the layer structure and the parameters between the layers. Specifically, if the types of layers are the same, it is ultimately determined whether or not the models of the two layers are the same based on the similarity of the layer structure and the parameters between the two layers. In the following, determination as to whether or not the layers of the same type are the same will be specifically described in detail.

Comparison Between Convolutional Layers

First, the layer structure (the number of filters) and the parameters (weight filter) in the convolutional layer will be described.

Figure 4:
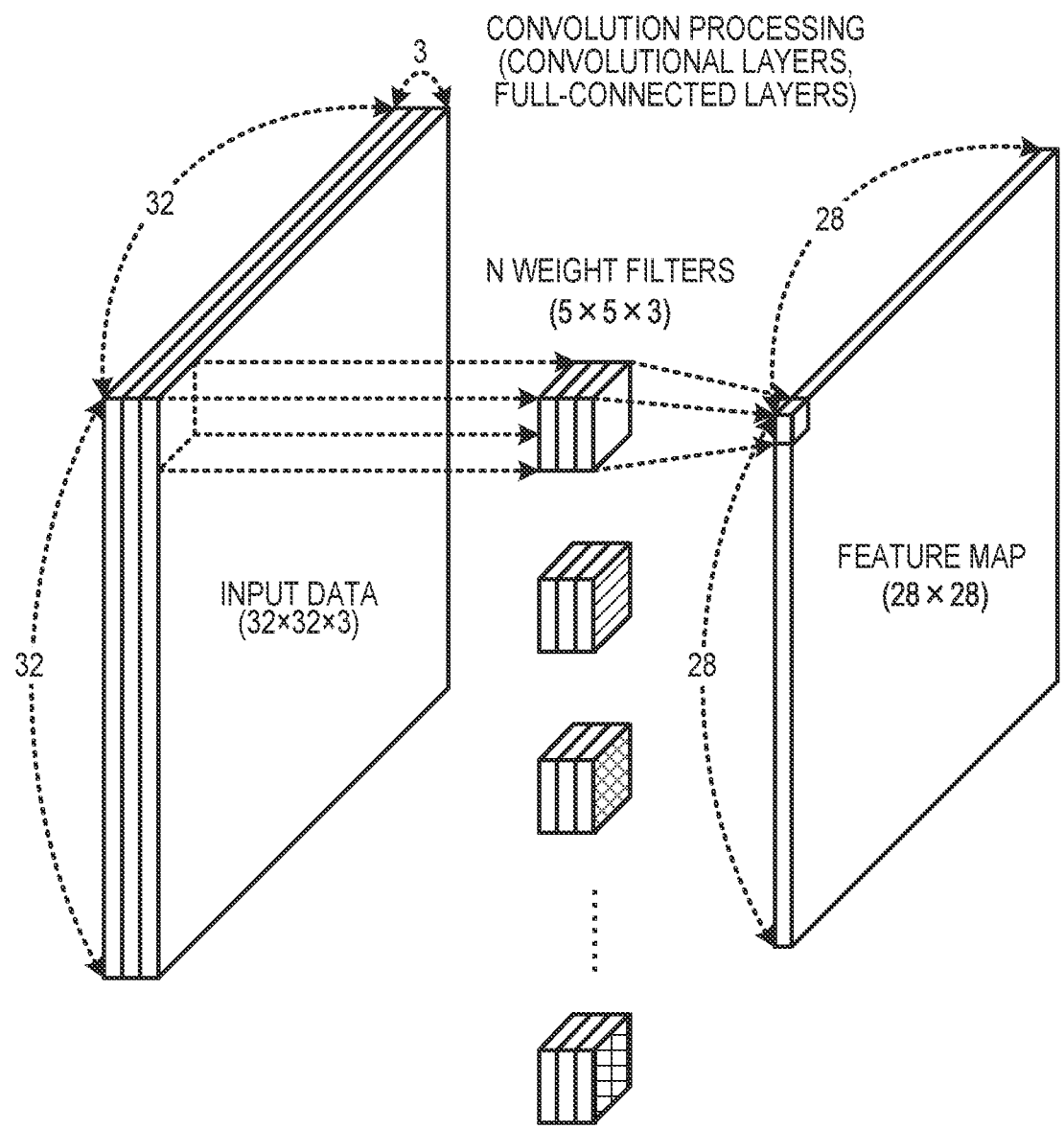
FIG. 4 is a diagram illustrating a convolutional relationship between input data and a feature map.

FIG. 4 is a diagram illustrating a convolutional relationship between input data and a feature map.

The processing in FIG. 4 is executed by the convolutional layers (the full-connected layers also). According to FIG. 4, one feature map is generated by applying one weight filter on input data. Note that, in the present embodiment, the sizes of the input data, the weight filter, and the feature map are as follows.

Input data: 32×32×3 elements
Weight filter: 5×5×3 elements (parameters)
Feature map: 28×28 elements N weight filters are prepared, which form the model parameter. That is, the "weight" means the N weight filters. Note that, here, the bias term is not considered.

Figure 5:
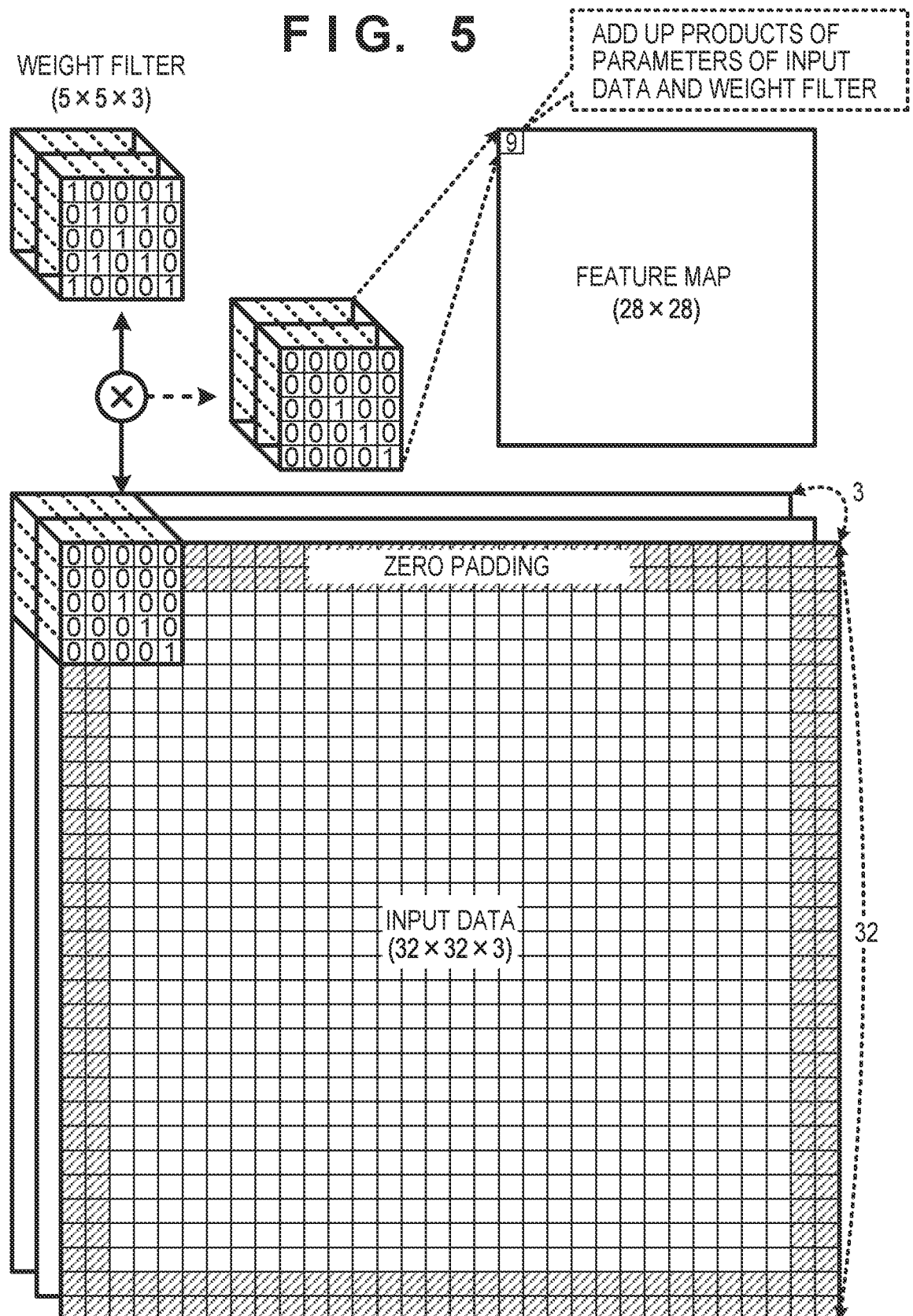
FIG. 5 is a diagram illustrating the generation of a feature map using a weight filter.

FIG. 5 is a diagram illustrating generation of a feature map using a weight filter.

As shown in FIG. 5, the value of one element of the feature map is obtained by applying one weight filter constituted by 5×5×3 elements to the input data, and adding up products of the respective elements. Also, one feature map is generated by moving the same weight filter relative to the input data. Here, the number of elements (movement amount) by which the weight filter is moved is referred to as a "stride". A zero-padding region can also be provided in peripheral edges of the input data that is filled with elements 0. With this, a weight filter having the same number of elements can be applied to the elements in the edges of the input data.

Figure 6:
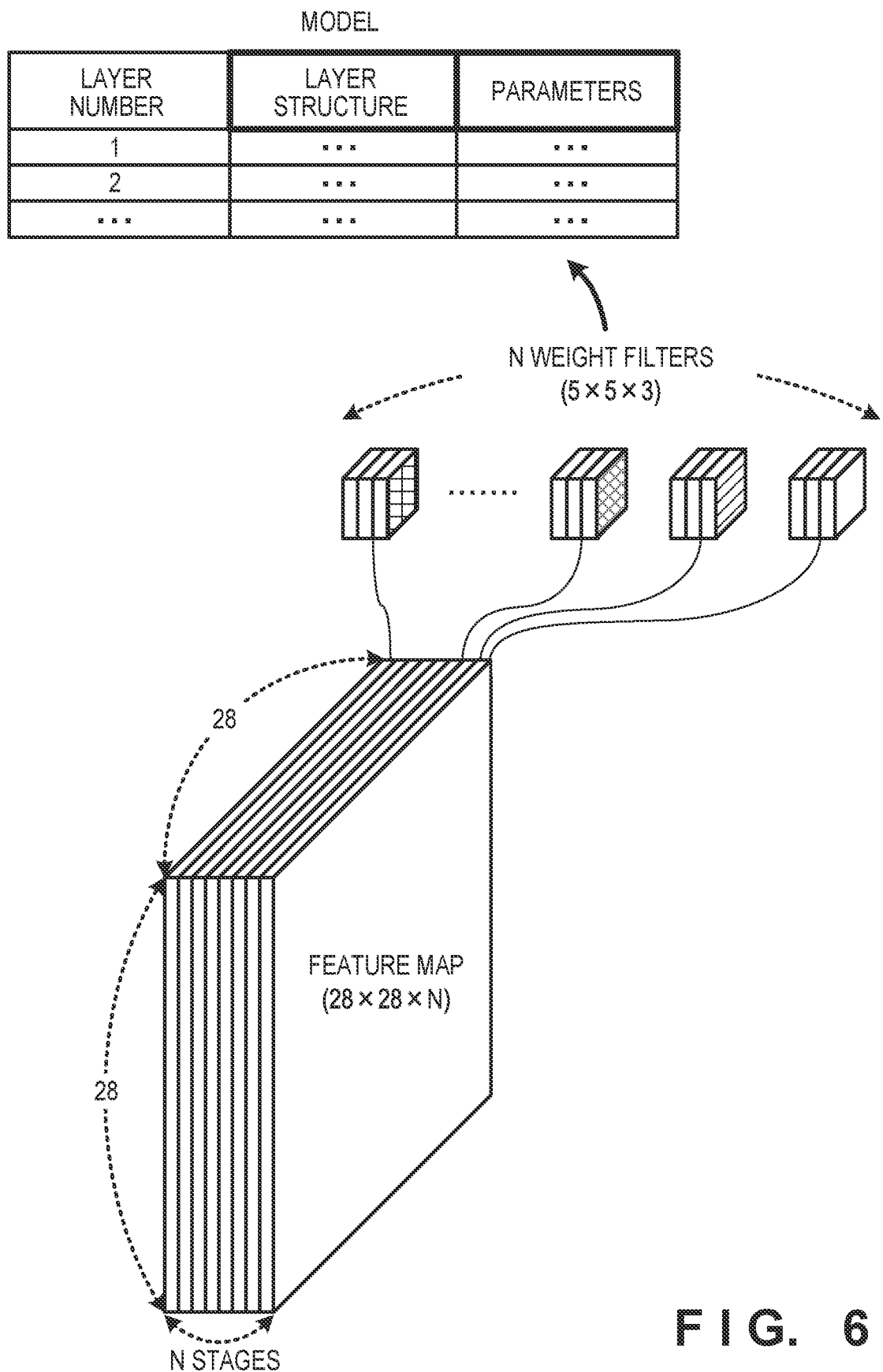
FIG. 6 is a diagram illustrating relationship between N weight filters and a feature map with N stages.

FIG. 6 is a diagram illustrating relationship between N weight filters and a feature map with N stages.

N weight filters are present. According to FIGS. 4 and 5, one feature map is generated from one weight filter. Therefore, a feature map with N stages is generated from the N weight filters, as shown in FIG. 6.

According to FIGS. 4 and 5 described above, one 5×5×3 filter is applied to a 32×32 (image size)×3 (RGB channels) input. This filter has 5×5×3+1=76 parameters. Usually, convolution is executed in a convolutional layer using N (a plurality of) filters. For example, a convolutional layer having 128 filters has 76×128 parameters. In a simplest case, these parameters are regarded as a feature vector, and the distance between two feature vectors are calculated using some rule, and it can be determined that the layers match if the distance is a given distance or less.

However, a re-use (modification) of a model can be performed by intentionally changing the structure of filters while keeping the effects of a weight filter. For example, a modification is possible in which (1) a filter size increases, (2) the sequence of the filters is changed, and (3) a filter is added or deleted. In contrast, according to the present embodiment, even if the structure of a weight filter is changed, it is possible to determine whether or not two layers are the same.

When two convolutional layers are compared, the following steps S211 to S214 are executed in order to perform determination using the parameters of a weight filter.

Step S211: A true (actual) filter size is estimated with respect to a weight filter of a convolutional layer. Specifically, absolute values of parameters in respective channels (RGB=3, for example) in a weight filter are accumulated. A minimum rectangle that includes all positions (parameters) at each of which the accumulated value is a predetermined threshold value or more is estimated as the true filter size.

Figure 7:
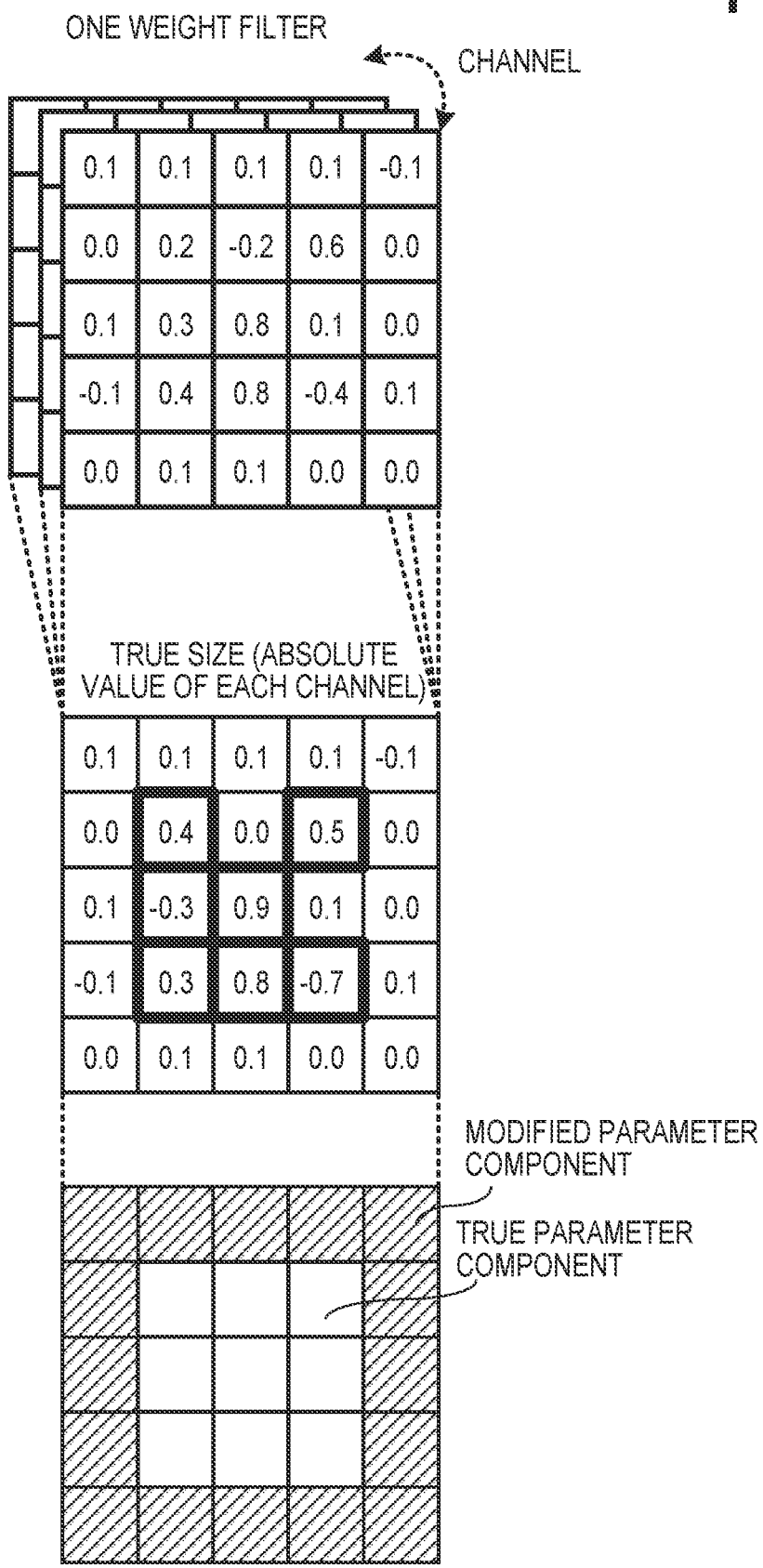
FIG. 7 is a diagram illustrating a true filter size estimated from a weight filter of a convolutional layer.

FIG. 7 is a diagram illustrating processing for estimating the true filter size from a weight filter of a convolutional layer.

For example, if a filter has a 5×5 size, it is possible that the true filter size is 2×2, 3×3, or 4×4. According to FIG. 7, a 5×5×3 weight filter is applied as a filter with respect to an input having a plurality of channels (RGB, for example). In this case, an absolute value of each of 5×5 parameters for each channel is obtained, and three absolute values at a same position of the respective filters with respect to the three channels are added. If the absolute values of parameters in a region other than the central 3×3 region are small, as shown in FIG. 7, it can be estimated that the true filter size is 3×3. This can be estimated from a minimum rectangle of a region of parameters of the filter whose absolute values are the threshold value or more. In FIG. 7, the threshold value is set to 0.2, and with this, the true filter size is estimated to be 3×3.

Step S212: The parameters of the weight filters to be compared are modified to have the estimated true filter size. If the true filter sizes of the convolutional layers to be compared do not match, it is determined that the convolutional layers are not the same. For example, if the filter size of one convolutional layer is 3×3×3, and the filter size of the other convolutional layer is 5×5×3, it is determined that these convolutional layers do not match.

Step S213: If the true filter sizes of the convolutional layers to be compared match, next, the parameters of the respective convolutional layers are compared. Here, the parameters of each weight filter are regarded as one vector, and each convolutional layer is expressed as a vector set. For example, a case is envisioned where the filter size and the number of filters of one convolutional layer are respectively 5×5×3 and 128, and the filter size and the number of filters of the other convolutional layer are respectively 5×5×3 and 64.

Figure 8:
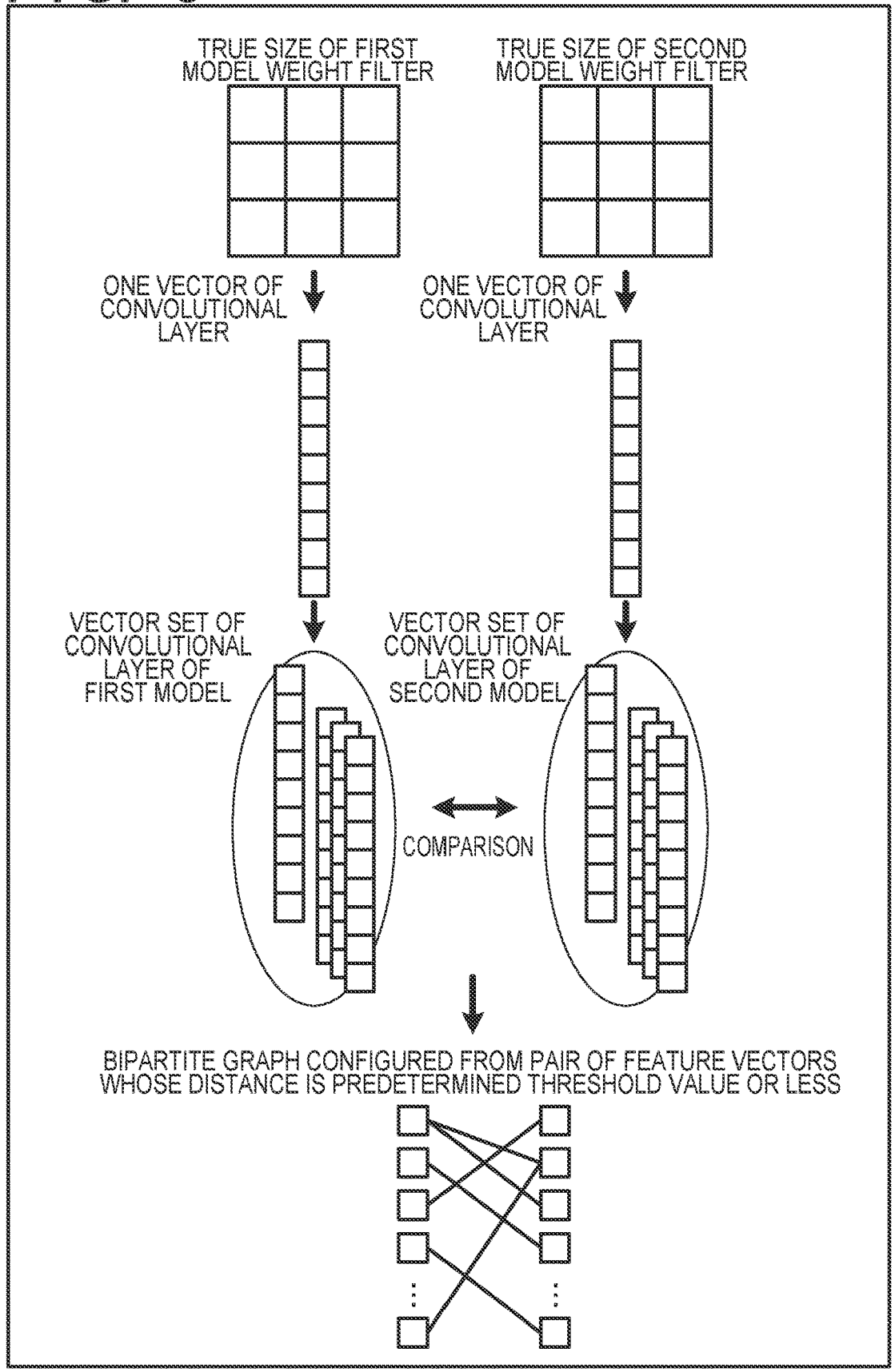
FIG. 8 is a diagram for illustrating a method of comparing convolutional layers.

FIG. 8 is a diagram illustrating a method of comparing parameters in a region having the true filter size between convolutional layers.

The parameters are compared between the convolutional layers by, regarding the parameters of each filter as a feature vector, calculating the distance between the set of feature vectors of one convolutional layer and the set of feature vectors of the other convolutional layer. For example, a "bipartite graph" is configured by obtaining, with respect to two feature vector sets, pairs of feature vectors whose distance is a predetermined threshold value or less. Then, the maximum number of matches calculated by solving a maximum matching problem with respect to the bipartite graph is set as the similarity. Also, each feature vector is quantized using Bag-of-Visual Words in image recognition, the quantization histogram is regarded as the feature vector of a convolutional layer, and the distance between the feature vectors can be used. Moreover, each feature vector is quantized, and the similarity between the quantization histograms can also be used as the similarity between vector sets.

The bipartite graph is a graph in which a vertex (parameter) set is divided into two subsets in each of which there are no edges between vertices. The bipartite graph is a graph obtained by dividing into two vertex sets V1 and V2 such that, although there are no edges between vertices in each of the vertex sets V1 and V2, there are edges between vertices in the vertex set V1 and vertices in the vertex set V2. The number of matches refers to the number of edges of an edge set in which none of two belonging edges are adjacent to each other. The maximum matching refers to an edge set that includes a maximum number of edges.

Step S214: The similarity between vector sets of respective convolutional layers to be compared is used as the similarity between the convolutional layers. Also, it can be determined that, if the similarity between convolutional layers is a predetermined threshold value or more, the two convolutional layers are the same.

Comparison Between Full-Connected Layers

When full-connected layers are compared, weights of a full-connected layer are regarded as a feature vector, and the full-connected layer is expressed as a vector set. Also, the similarity between vector sets (distance between vector sets, for example) of respective full-connected layers to be compared is used as the similarity between the full-connected layers. Also, it can be determined that, if the similarity between full-connected layers is a predetermined threshold value or more, the two full-connected layers are the same.

When a full-connected layer includes a bias term, the full-connected layer can be expressed by [(number of output dimensions)×((number of input dimensions)+1)] parameters ([(number of output dimensions)×(number of input dimensions)] parameters, if a bias term is not included). With respect to these parameters, weights (factors to be applied on inputs) having (number of input dimensions+1) dimensions are regarded as a feature vector, and a full-connected layer is expressed as a set of these feature vectors.

Comparison Between Activation Layers

When activation layers are compared, if types of the activation layers are the same and a distance between parameters is a predetermined threshold value or less, the distance is calculated as the similarity. In other cases, the similarity is set to 0. Also, if the similarity between activation layers is a predetermined threshold value or more, it can be determined that the two activation layers are the same. The type of the activation layer is one of a linear connection, a sigmoid function, a hard sigmoid function, a tanh function (hyperbolic tangent function), a softsign function, a softplus function, a ReLU (Rectified Linear Unit).

Comparison Between Pooling Layers

When pooling layers are compared, if types of the pooling layers are the same and a distance between parameters is a predetermined threshold value or less, the distance is calculated as the similarity. In other cases, the similarity is set to 0. Also, if the similarity between pooling layers is a predetermined threshold value or more, it can be determined that the two pooling layers are the same. The type of the pooling layer is one of max pooling and average pooling. The parameters are a filter size and a stride (interval at which a filter is applied).

Then, if all layers in one neural network have been subjected to comparison, and the comparison results with respect to the respective layers subjected to comparison all indicate matching, it can be determined that one neural network is generated by modifying or re-training the other neural network.

Also, in a multilayered neural network, only a portion of another neural network may be re-used. Therefore, if results indicating matching are obtained with respect to a predetermined number of or more layers, it can be determined that one neural network is generated by modifying or re-training the other neural network. Note that the predetermined number can be one or more. Also, the configuration may be such that, instead of determining modification with respect to the entire neural network, matching/unmatching is determined in units of layers, and the determination result is output. That is, the configuration can be such that it is determined whether or not a certain layer in one neural network is re-used in the other neural network.

Also, the type of a layer can be used as a determination condition such as a case where, if the number of matched convolutional layers is a predetermined number or more, it is determined that one neural network is generated by modifying or re-training a portion of the other neural network. Note that the predetermined number can be one.

Also, the configuration may be such that, instead of determining matching/unmatching with respect to each layer subjected to comparison, the similarity between one neural network and the other neural network is determined by adding up similarities.

As described in detail, according to the present embodiment, even if a portion of the model of a neural network is modified or re-trained, the modification can be detected by performing comparison between models.

Figure 9:
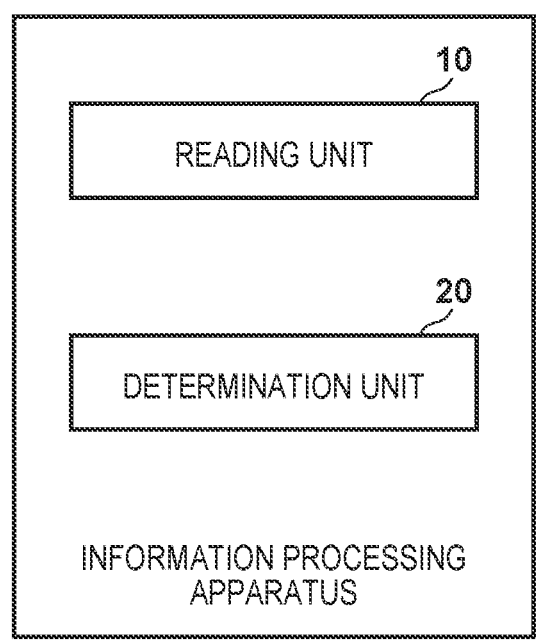
FIG. 9 is a configuration diagram of the information processing apparatus according to one embodiment.

FIG. 9 is a configuration diagram of the information processing apparatus according to the present embodiment. A reading unit 10 reads layer structures and parameters with respect to respective layers of models of two neural networks that are to be compared. A determination unit 20 determines whether or not modification has been performed by comparing the layer structures and the parameters of the models of the two neural networks that have been read by the reading unit 10.

Also, the information processing method or the information processing apparatus described above can also be realized by a computer program. The program, upon being executed by one or more processors of a computer, causes the computer to execute the information processing method described above. Alternatively, the program, upon being executed by one or more processors of a computer, causes the computer to function as the information processing apparatus described above. The computer program is stored in a non-transitory computer readable storage medium.

The present invention is not limited to the above embodiments and various changes and modifications can be made within the spirit and scope of the present invention. Therefore, to apprise the public of the scope of the present invention, the following claims are made.

The invention claimed is:

1. An information processing method comprising:
   reading a layer structure and parameters of layers from each model of a respective one of two neural networks, wherein one of the models is modified by changing a structure of a plurality of filters while keeping a plurality of effects of a weight filter, the changing of the structure of the filters comprising performing at least one of increasing a filter size, changing a sequence of the filters, adding another filter, or deleting one of the filters; and
   determining a degree of matching between the models of the two neural networks, by comparing layers, of the respective models of the two neural networks, that are configured as a graph-like form in respective hidden layers, in order from an input layer using breadth first search or depth first search, based on similarities between respective layers,
   wherein the determining the degree of matching between the models of the two neural networks includes, when convolutional layers are compared,
      estimating a true filter size with respect to each weight filter of the convolutional layers,
      modifying parameters of weight filters to be compared to respective estimated true filter sizes,
      expressing the convolutional layers by vector sets by regarding parameters of each weight filter as one vector, and
      setting a similarity between the vector sets of the respective convolutional layers to be compared as a similarity between the convolutional layers, and
   wherein the estimating the true filter size includes
      accumulating absolute values of parameters of respective channels in each of the weight filters, and
      estimating a minimum rectangle that includes all positions at which accumulated values are a predetermined threshold value or more, as a true filter size.

2. The information processing method according to claim 1, wherein the determining the degree of matching between the models of the two neural networks includes, if types of layers to be compared are different, setting a similarity to 0, and not performing comparison in layers in a later stage than the layers subjected to the comparison.

3. The information processing method according to claim 1,
   wherein the determining the degree of matching between the models of the two neural networks includes, when full-connected layers are compared,
      expressing each of the full-connected layers, by regarding weights of each of the full-connected layers as a feature vector, using a vector set, and
      setting a similarity between the vector sets of the respective full-connected layers to be compared as a similarity between the full-connected layers.

4. The information processing method according to claim 1,
   wherein the similarity between the vector sets is obtained by
      configuring a bipartite graph by obtaining pairs of feature vectors whose distance is a predetermined threshold value or less, and
      calculating a maximum number of matches by solving a maximum matching problem from the bipartite graph.

5. The information processing method according to claim 1,
   wherein the similarity between the vector sets is obtained by
      quantizing respective feature vectors, and
      obtaining a similarity between quantization histograms.

6. The information processing method according to claim 1,
   wherein the determining the degree of matching between the models of the two neural networks includes, when activation layers are compared,
      setting, if types of the activation layers are the same, and a distance between parameters is a predetermined threshold value or less, the distance as a similarity, and in other cases, 0 to the similarity.

7. The information processing method according to claim 6, wherein the type of the activation layer is a linear connection, a sigmoid function, a hard sigmoid function, a tanh function (hyperbolic tangent function), a softsign function, a softplus function, or a ReLU (Rectified Linear Unit).

8. The information processing method according to claim 1,
   wherein the determining the degree of matching between the models of the two neural networks includes, when pooling layers are compared,
      setting, if types of the pooling layers are the same, and a distance between parameters is a predetermined threshold value or less, the distance as a similarity, and in other cases, 0 to the similarity.

9. The information processing method according to claim 8,
   wherein the type of the pooling layer is max pooling or average pooling, and
   the parameters are a filter size and an interval at which a filter is applied.

10. An information processing apparatus comprising:
    one or more processors; and
    one or more memory devices that store one or more programs,
    wherein the one or more programs, when executed by the one or more processors, cause the one or more processors to perform:
    reading a layer structure and parameters of layers from each model of a respective one of two neural networks, wherein one of the models is modified by changing a structure of a plurality of filters while keeping a plurality of effects of a weight filter, the changing of the structure of the filters comprising performing at least one of increasing a filter size, changing a sequence of the filters, adding another filter, or deleting one of the filters; and
    determining a degree of matching between the models of the two neural networks, by comparing layers, of the respective models of the two neural networks, that are configured as a graph-like form in respective hidden layers, in order from an input layer using breadth first search or depth first search, based on similarities between respective layers,
    wherein the determining the degree of matching between the models of the two neural networks includes, when convolutional layers are compared,
       estimating a true filter size with respect to each weight filter of the convolutional layers, modifying parameters of weight filters to be compared to respective estimated true filter sizes, expressing the convolutional layers by vector sets by regarding parameters of each weight filter as one vector, and setting a similarity between the vector sets of the respective convolutional layers to be compared as a similarity between the convolutional layers, and wherein the estimating the true filter size includes accumulating absolute values of parameters of respective channels in each of the weight filters, and estimating a minimum rectangle that includes all positions at which accumulated values are a predetermined threshold value or more, as a true filter size.

11. A non-transitory computer readable storage medium storing a program, the program causes, upon being executed by one or more processors of a computer, the computer to execute:

reading a layer structure and parameters of layers from each model of a respective one of two neural networks, wherein one of the models is modified by changing a structure of a plurality of filters while keeping a plurality of effects of a weight filter, the changing of the structure of the filters comprising performing at least one of increasing a filter size, changing a sequence of the filters, adding another filter, or deleting one of the filters; and determining a degree of matching between the models of the two neural networks, by comparing layers, of the respective models of the two neural networks, that are configured as a graph-like form in respective hidden layers, in order from an input layer using breadth first search or depth first search, based on similarities between respective layers, wherein the determining the degree of matching between the models of the two neural networks includes, when convolutional layers are compared, estimating a true filter size with respect to each weight filter of the convolutional layers, modifying parameters of weight filters to be compared to respective estimated true filter sizes, expressing the convolutional layers by vector sets by regarding parameters of each weight filter as one vector, and setting a similarity between the vector sets of the respective convolutional layers to be compared as a similarity between the convolutional layers, and wherein the estimating the true filter size includes accumulating absolute values of parameters of respective channels in each of the weight filters, and estimating a minimum rectangle that includes all positions at which accumulated values are a predetermined threshold value or more, as a true filter size.

* * * * *